(12) United States Patent
Ribeiro

(10) Patent No.: US 9,898,100 B2
(45) Date of Patent: Feb. 20, 2018

(54) AUTHENTICATING STYLUS DEVICE

(71) Applicant: MICROSOFT TECHNOLOGY LICENSING, LLC, Redmond, WA (US)

(72) Inventor: Flavio Protasio Ribeiro, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 5 days.

(21) Appl. No.: 14/730,501

(22) Filed: Jun. 4, 2015

(65) Prior Publication Data

US 2016/0357275 A1  Dec. 8, 2016

(51) Int. Cl.
| | |
|---|---|
| *G06F 21/00* | (2013.01) |
| *G06F 11/30* | (2006.01) |
| *G06F 3/0354* | (2013.01) |
| *G06F 21/35* | (2013.01) |
| *H04L 9/08* | (2006.01) |

(Continued)

(52) U.S. Cl.
CPC ........ *G06F 3/03545* (2013.01); *G06F 3/0412* (2013.01); *G06F 21/35* (2013.01); *G06K 9/00402* (2013.01); *H04L 9/0825* (2013.01); *H04L 9/0861* (2013.01); *H04L 9/0869* (2013.01); *H04L 9/3228* (2013.01); *H04L 63/0442* (2013.01); *H04L 63/18* (2013.01)

(58) Field of Classification Search
CPC .... G06F 3/03545; G06F 3/0412; G06F 21/35; H04L 63/0442; H04L 9/0825; H04L 9/0861; H04L 9/0869; H04L 9/3228; H04L 63/18

USPC ......................................................... 713/189
See application file for complete search history.

(56) References Cited

U.S. PATENT DOCUMENTS 7,278,017 B2 * 10/2007 Skantze ................ H04L 9/0825
380/258
7,363,505 B2    4/2008 Black
(Continued)

FOREIGN PATENT DOCUMENTS

| EP | 1292882 B1 | 7/2006 |
| WO | 2001095559 A1 | 12/2001 |

OTHER PUBLICATIONS

Garcia-Salicetti, Sonia and Houmani, Nesma, Digitizing Tablet, "Encyclopedia of Biometrics", Jun. 2009, accessed Oct. 12, 2017, Springer US, Boston, MA, pp. 224-228, isbn: 978-0-387-73003-5, doi: 10.1007/978-0-387-73003-5_19, https://doi.org/10.1007/978-0-387-73003-5_19.*

(Continued)

*Primary Examiner* — Eric W Shepperd
*Assistant Examiner* — Feliciano Mejia
(74) *Attorney, Agent, or Firm* — International IP Law Group, PLLC

(57) ABSTRACT

Various methods and systems for authenticating and identifying stylus devices are described herein. In one example, a method includes receiving a value generated by the stylus device during an initialization stage. The method includes receiving a code generated from the stylus device during an authentication stage. The method also includes cryptographically authenticating an author of digital ink corresponding to the stylus device on a computer device based in part on the value and the received code.

14 Claims, 6 Drawing Sheets

(51) Int. Cl.
*G06F 3/041* (2006.01)
*G06K 9/00* (2006.01)
*H04L 29/06* (2006.01)
*H04L 9/32* (2006.01)

(56) References Cited

U.S. PATENT DOCUMENTS

| | | | |
|---|---|---|---|
| 7,426,643 B2 | 9/2008 | Homer et al. | |
| 7,457,413 B2 * | 11/2008 | Thuvesholmen | H04L 9/0643 358/478 |
| 7,609,863 B2 | 10/2009 | Black | |
| 8,022,943 B2 * | 9/2011 | Silverbrook | G06F 3/014 178/18.01 |
| 8,285,991 B2 | 10/2012 | Scheidt | |
| 8,787,564 B2 | 7/2014 | Brown | |
| 2006/0005023 A1 | 1/2006 | Homer et al. | |
| 2010/0079414 A1 | 4/2010 | Ferlitsch | |
| 2010/0139992 A1 | 6/2010 | Delia et al. | |
| 2012/0242603 A1 | 9/2012 | Engelhardt | |
| 2012/0331546 A1 | 12/2012 | Falkenburg et al. | |
| 2013/0106799 A1 * | 5/2013 | Yilmaz | G06F 3/044 345/179 |
| 2014/0035883 A1 | 2/2014 | Mercea et al. | |
| 2014/0092069 A1 * | 4/2014 | Bentov | G06F 1/26 345/179 |
| 2014/0232700 A1 * | 8/2014 | Park | G06F 21/36 345/179 |
| 2016/0048224 A1 * | 2/2016 | Brunet | G06F 3/03545 345/174 |

OTHER PUBLICATIONS

Sanada, et al., "The Analysis of Pen Inputs of Handwritten Symbols using Self Organizing Maps and its Application to User Authentication", In Proceedings of International Joint Conference on Neural Networks, Jul. 16, 2006, pp. 2577-2582.
"Inkml : A Digital Ink Format", Published on: Oct. 2004 Available at: http://www.webforefront.com/about/danielrubio/articles/ostg/inkml.html.
"Crypto-Sign™—A White Paper", In White Paper, Mar. 29, 2004, 8 pages.
International Search Report, dated Jul. 18, 2016, Application No. PCT/US2016/031953, Filed Date: May 12, 2016, pp. 8.
"Second Written Opinion Issued in PCT Application No. PCT/US2016/031953", dated May 4, 2017, 4 Pages.
"International Preliminary Report on Patentability Issued in PCT Application No. PCT/US2016/031953", dated Aug. 8, 2017, 7 Pages.

* cited by examiner

AUTHENTICATING STYLUS DEVICE

BACKGROUND

Security tokens are used to authenticate or prove an identity of a user of a computer device. Sequence-based tokens generate a sequence of codes which can be used to add a layer of security to authentication procedures. Using security tokens adds a step to the user and device authentication process, which can include, for example, typing a code or inserting a smartcard. Authentication systems using security tokens, such as sequence-based tokens, can include prompting a user to enter a code retrieved from a hardware token device or software token application as part of the authentication process.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a stylus device that includes a first module to generate and store cryptographic credentials that include a secret value. The stylus device includes a second module to transmit the secret value from the stylus device over a secure channel to a computer device. The stylus device includes a third module to generate a sequence of codes which depend on the secret value. The stylus device includes a fourth module to transmit the sequence of codes over a channel.

During operation, the stylus broadcasts cryptographic credentials over one or more channels to the computer device, which may include public channels monitored by eavesdroppers. The computer device can use, for example, a combination of a stored stylus ID, decryption key, and initial seed value and time corresponding to generation of the initial seed value to authenticate that the stylus broadcasting the stylus ID is the same stylus which claimed this stylus ID during a security setup procedure, and not a rogue clone stylus.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
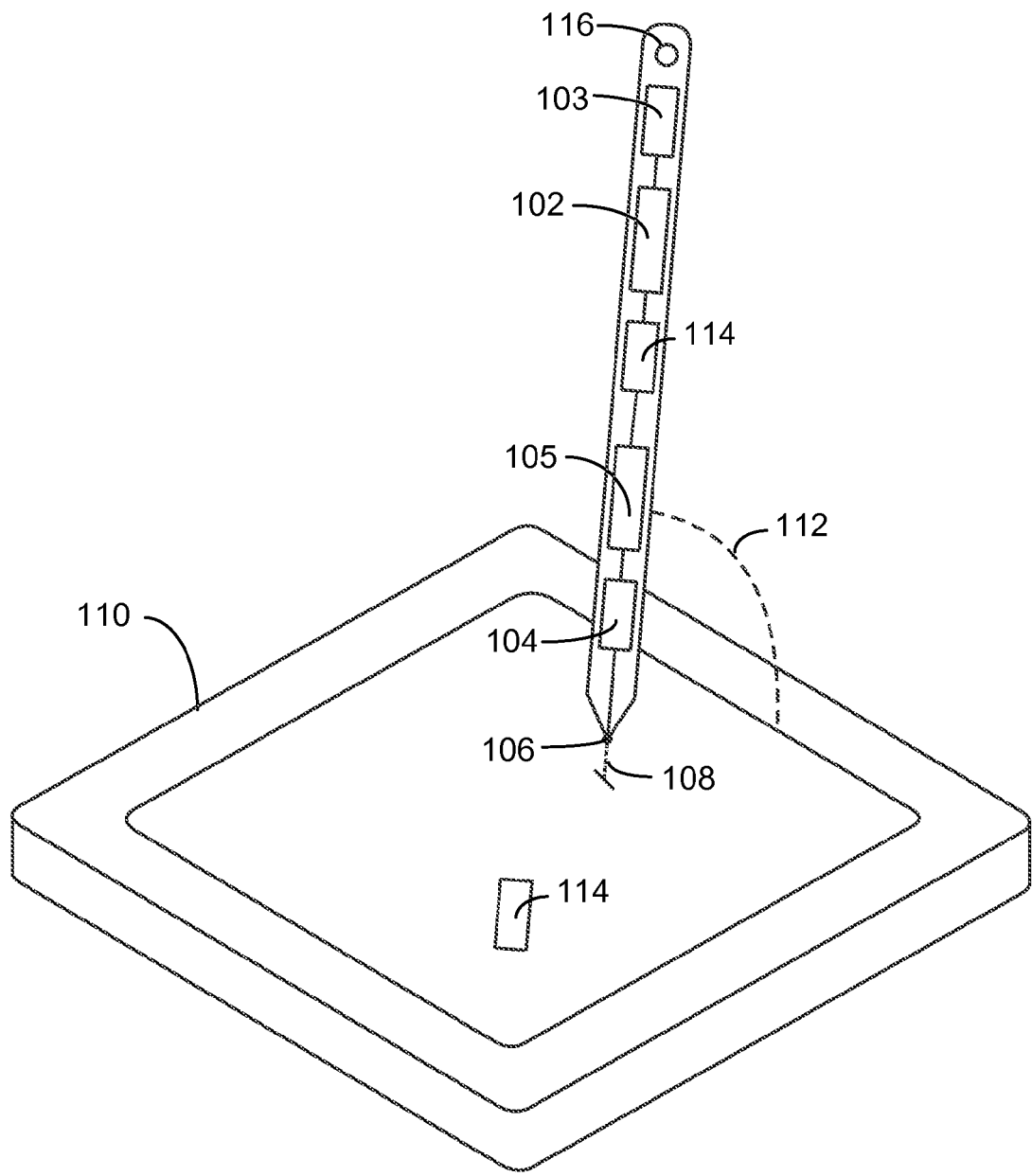
FIG. 1 is a schematic of a stylus device augmented with cryptographic hardware and applications on an internal circuit.

In computer technology, a stylus is a writing utensil typically in the shape of a pen that is used to interact with, for example, a touch screen of a tablet computer device. In embodiments herein, a stylus is an input device that can transmit data and control signals to a computer device. A digitizer component on the computer device may be used to determine stylus position and orientation, allowing for example a user to trace lines which are then represented as digital ink on a display. The digitizer may also be used to communicate data between the stylus and the computer, such as pressure, battery level, button state and serial number.

Conventional stylus pens broadcast a stylus ID (e.g., a unique serial number) over a digitizer interface, without any encryption and to any suitable device. In some instances, an attacker could create a rogue clone stylus device which broadcasts another stylus device's ID. Thus, using stylus ID alone is not a secure method of identifying the author of digital ink. The techniques described herein can effectively prevent stylus ID cloning and provide additional layers of security and factors for authentication through the encryption techniques described herein.

In some embodiments, a stylus device can automatically act as a token in a cryptographically secure manner. For example, a stylus can generate and transmit codes to cryptographically authenticate digital ink as being produced by a specific stylus device and by a specific user, thereby protecting against stylus ID cloning, which is a vulnerability today. Digital ink, as referred to herein, can include any suitable input provided by a stylus device to a computing device. For example, digital ink can correspond to signatures, handwritten notes, illustrations, figures or diagrams produced by a stylus device. Typical sequence-based tokens impose additional authentication burdens on the user, whereas the embodiments described obviate a user's need to type in a code for every authentication, while still providing an additional factor in an authentication procedure.

Automating user authentication and ink authorship determination is relevant in many applications. In one example, multiple users interact with the same computing device using their respective personal stylus devices. Such interactions may happen in close temporal succession or even simultaneously during collaborative tasks. Some embodiments may be used to obviate a manual authentication process that could interrupt the inking activity (e.g., by displaying an authentication screen or dialog box) or temporarily disrupt or inhibit input from one or more users. Some embodiments thus allow a computer device to assign authorship to the digital ink produced by each author in an automatic and imperceptible yet cryptographically secure manner. In another example, a user may be interacting with a third-party or public computer with a personal stylus device. Some embodiments allow for user identification and ink authorship determination without an explicit declaration of identity from the user, without providing secrets that could be exploited by an attacker, and in a cryptographically secure manner.

In some embodiments, the stylus can be used to provide a second factor for user authentication, independent of an inking activity. In these cases, it is assumed that a stylus is owned by a single user, such that the detection and authentication of a stylus with a specific ID (e.g., unique serial number) implies the proximity of its owner. A computer device requesting authentication of a user can request a second factor of authentication, which can be provided by the stylus. This embodiment could be used to replace or complement other secondary authentication factors, such as those provided by biometrics, smartcards, and other hardware or software token devices.

Encryption techniques can include encryption and decryption keys. Given a specific cryptographic algorithm, an encryption key specifies how plaintext is transformed into cyphertext. Conversely, a decryption key specifies how cyphertext is transformed into plaintext. Cryptographic techniques can also include hash functions, which transform any arbitrarily sized block of digital data into a block of fixed size, referred to as a hash value or simply hash. Cryptographic hash functions are designed to easily verify that a given input block maps to a provided hash value, while making it deliberately difficult to reconstruct the input block from a provided hash, modify the input block without modifying the hash, and find two input blocks with the same hash.

Symmetric encryption utilizes identical encryption and decryption keys, and plaintext is encrypted and ciphertext decrypted with the same key. In symmetric encryption, the sender and receiver parties must both have access to the secret key, and if either party is compromised, then an attacker may be able to gain unauthorized access to plaintext. Asymmetric encryption uses an encryption key and a decryption key that are different from one another. In some applications, one of the keys is secret (or private), while the other is public. Applications of asymmetric encryption with public and private keys can allow the public key can be revoked by its issuer, who can then generate a new replacement public and private key pair to be used in future communications, thus providing additional security measures against loss of the private key.

In some examples described herein, the private key can be used to encrypt plaintext, while the public key is to decrypt ciphertext. In other examples, symmetric encryption is used. In other examples, a single key may be used with conjunction with a hash function. Embodiments presented herein are targeted at a secure initialization, key transfer and authentication procedure for a stylus device generating one key or key pair, and authenticating an author of digital ink with the stylus device on a computer device with access to this key or key pair.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media and devices can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a schematic of a stylus device 100 augmented with cryptographic hardware and applications. The stylus device 100 can be any type of electronic pen or stylus capable of writing on computer devices, such as tablet devices or phones, for example. The circuit 102 within the stylus device 100 can process information, such as, for example, application software for cryptographically authenticating the stylus device. The components of the stylus device 100 can be powered by a battery 103, for example. The stylus device can include a storage unit 105 connected to the circuit 102. The storage unit 105 can be either volatile memory or non-volatile memory of any type. The circuit 102 can be connected to a signal transmitter 104 through a cable, bus, or by any suitable means. The signal transmitter 104 can transmit a signal, for example, of arbitrary bit streams, directed through the tip 106 of the stylus device 100 through a digitizer channel 108 to a computer device 110. The digitizer channel 108 conveys information when the tip 106 of the stylus device 100 is within a certain range with respect to the computer device 110.

In embodiments, the digitizer channel 108 is used to convey digital data such as pressure exerted by the tip 106 and power level of the battery 103 of the stylus device 106. The digitizer channel 108 is used to transmit data over a short distance, for example, about 15 millimeters. The digitizer channel 108 is also used to convey cryptographic data described herein. In some embodiments, the signal transmitter 104 transmits data through a wireless auxiliary channel 112. The wireless auxiliary channel 112 can convey radio waves through Bluetooth Low Energy (BLE), for example, using advertisement frames. An advertisement frame is a frame that is transmitted to allow the existence of a network or device to be discovered, while periodically broadcasting application-specific data payloads. BLE uses little power, allowing the battery 103 to maintain a charge for an extended period of time. Advertisement frames do not require Bluetooth pairing and can thus be received by any Bluetooth host in range. BLE also has a small range for transmitting data, which can provide an additional layer of protection against a potential eavesdropper. In some embodiments, the stylus device 100 and the computer device 110 include real-time clock (RTC) components 114 in order to track time, for example, a time since an initial seed value is generated. It is to be understood that RTC components 114 include internal hardware for the stylus device 100 and computer device 110.

The circuit 102 is configured to initialize the cryptographic credentials, which can be used to authenticate the identity of the stylus device 100. Cryptographic credentials can include, for example, an encryption key, a decryption key, an initial seed value $X_0$ and a timestamp $T_0$ corresponding to the instant the cryptographic credentials are generated. In some embodiments, the cryptographic credentials may also include a stylus ID such as a serial number related to the stylus device 100 that is stored at the circuit 102. The stylus ID is uniquely identifiable and used in authenticating the identity of the stylus device 100 among other styluses. In a computer device 110 that is accessed by or within range of multiple styluses, the cryptographic credentials for one or more styluses may be simultaneously stored and recalled using stylus ID as a unique lookup key. Additionally, the stylus device 100 can store the cryptographic state in storage unit 105.

In some embodiments, the cryptographic credentials are initialized in response to the user pressing and holding a security setup button 116 for a prescribed amount of time guaranteed not to be the result of an accidental button press (e.g., 10 seconds). This action instructs the processing circuit 102 to erase cryptographic credentials previously stored in storage unit 105, generate new cryptographic credentials, and write them to storage unit 105. The security setup process is concluded by transmitting from the stylus device 100 to the computer device 110 one or more components of the cryptographic credentials, such as the decryption key, the initial seed value $X_0$, the timestamp $T_0$ and the stylus ID. It will be recognized that the transmission can be arbitrarily deferred with respect to the initiation of the security setup process. It is assumed that if this transmission includes secret information, then it occurs over a channel that is deliberately difficult to be monitored by an eavesdropper. In some embodiments, this transmission can occur over the digitizer channel 108, which generally has short range (e.g., 1.0-2.0 cm), requiring the stylus 100 to be in very close proximity to the computer device 110. In other embodiments, this transmission can occur over a channel encrypted using other methods, which are assumed to be secure. The security setup process makes the device ready for future authentication.

In some embodiments, the stylus device 100 internally generates a sequence of codes, for example, $X_0, X_1, \ldots, X_n$, adding a new element to the sequence at a prescribed cadence which is known to the computer device 110 (e.g., every N seconds, or upon pressing a button on the stylus). In embodiments, this sequence (including the seed value $X_0$) can be produced by a cryptographically secure pseudorandom number generator (CSPRNG). In other embodiments, this sequence can be produced by recursive application of a cryptographically secure hash function to an initial seed value $X_0$, such that the sequence $X_0, X_1, \ldots, X_n$ is known as a hash chain. In embodiments where the generation of codes is triggered by time, the time elapsed between the time $T_0$ when the initial seed value was generated and the current time $T_{now}$ is generally tracked by both the stylus device 100 and computer device 110. The stylus device 100 may encrypt each code of the sequence $X_0, X_1, \ldots, X_n$ with an encryption key generated by the stylus device 100 during a setup phase and stored as a secret value. The sequence $Y_0, Y_1, \ldots, Y_n$ represents the corresponding sequence of encrypted codes (also referred to herein as a sequence of digital signatures).

The digital signature or encrypted sequence can be transmitted, for example, over the digitizer channel 108, the wireless auxiliary channel 112, or another wireless communication channel to a computer of interest such as computer device 110. In the general field of information security, digital signatures can be used to detect forgery, tampering, or other unauthorized accesses to hardware, firmware, software and information. A valid or authenticated digital signature indicates to the recipient computer device 110 that the signal and message were created and transmitted by a known sender without being altered, in transit or otherwise.

In accordance to the previous embodiments, a stylus 100 may be authenticated. A computer device 110 that participated in the security setup process with stylus 100 has a copy of its decryption key, as well as the initial seed $X_0$ and the timestamp $T_0$ when it was generated. Let $\tilde{Y}_i$ be a value received by computer device 110 from an unauthenticated stylus, which claims to have the same stylus ID stored in the security setup process. The computer device decrypts the received value $\tilde{Y}_i$ with the decryption key from 100, obtaining a value $\tilde{X}_i$. As described previously, the cadence of code generation $X_0, X_1, \ldots, X_n$ is known to the computer device 110. Irrespective of the criteria used to trigger the generation of a new code by the stylus 100, it is assumed that the computer device 110 can estimate how many codes have been generated since stylus 100 was initialized or last authenticated. For example, if a new code is known to be generated every N seconds, the computer device 110 may use its RTC 114 to obtain the current time $T_{now}$. Ignoring RTC drift, the number of sequence values generated since time $T_0$ is given by $k=\lfloor (T_{now}-T_0)/N \rfloor$ where $\lfloor x \rfloor$ represents rounding down to the largest integer that does not exceed x. The computer device 110 can then use the same code generation method of stylus 110 (e.g., a PRNG or hash chain) to recreate the sequence $X_0, X_1, \ldots, X_k$. The stylus is authenticated if $\tilde{X}=X_k$.

Another computer device that may be attempting to eavesdrop on, for example, a BLE transmission from the stylus device 100 containing the encrypted sequence $Y_0, Y_1, \ldots, Y_n$, and not having either the decryption key or initial seed $X_0$ will get no useful information. Not having the initial seed $X_0$ implies the inability to generate the correct sequence $X_0, X_1, \ldots, X_k$, preventing continuation of the authentication process. Not having the decryption key implies the inability to decrypt a received value $\tilde{Y}_i$ and obtain a correct value $\tilde{X}_i$, also preventing continuation of the authentication process. Thus, both the initial seed $X_0$ and decryption key are secrets which may independently enable cryptographically secure authentication, and when combined may provide independent layers of security. It is recognized that this statement is contingent on the use of a cryptographically secure encryption algorithm and cryptographically secure PRNG.

Embodiments are possible with either symmetric or asymmetric encryption algorithms. If a symmetric encryption is used, the encryption and decryption keys are the identical, implying that an attacker with knowledge of one automatically has knowledge of the other. While this does may not reveal other secrets which may exist, such as the value of an initial seed $X_0$, it generally weakens the security of the system and reduces the effort needed to create a rogue clone stylus. If an asymmetric encryption is used, an attacker with knowledge of the decryption key is no closer to having the encryption key, and is therefore no closer to creating a rogue clone stylus.

It is also recognized that embodiments are possible where the seed $X_0$ is not a secret and security is guaranteed through the use of suitable encryption, where encryption or decryption keys are the secrets. Embodiments with either symmetric or asymmetric encryption may satisfy this description.

Embodiments are possible with asymmetric encryption where the only secret is the private key, which is the encryption key. This key may be generated by the stylus device 100 during the security setup process and never transmitted out by any means. In this configuration, the seed $X_0$ and the public (decryption) key may be made public. As long as the private key remains secret (e.g., by restricting access to the stylus, or designing its hardware with tamper resistant features that hinder extraction of the private key), the stylus may be cryptographically authenticated by the previously described process.

In some embodiments, the cryptographic credentials transmitted by the stylus during the security setup process (e.g., the decryption key, the initial seed value $X_0$, the timestamp $T_0$ and the stylus ID) may be forwarded (e.g., over a network connection, possibly secured by other means of encryption) by the associated computing device to a cloud service. A cloud or cloud service can, for example, include multiple servers connected over one or more networks. An authentication service can then be implemented remotely in the cloud, executing the authentication procedure described previously. This may allow any device with a network connection to the cloud service (and not only a specific computing device 110) to forward a received stylus ID and encrypted sequence $Y_0, Y_1, \ldots, Y_n$ to the authentication service on the cloud, whose role is to respond with positive or negative authentication of an unknown stylus device.

Embodiments are also possible where the communication channels are bi-directional, allowing the transmitter and receiver agents described herein to be exchanged and the stylus device to authenticate the identity of the computer device. It is recognized that a bi-directional short-range digitizer channel may allow secrets, including cryptographic keys and seed values, to be exchanged in both directions during a security setup process, with negligible risk of being obtained by an eavesdropper. Once a security setup is complete, a bidirectional long-range and potentially insecure channel can be used for two-way authentication methods, which may include challenge-response authentication using hashes or public keys.

It is to be understood that the illustration of FIG. 1 is not intended to indicate that the stylus 100 and computer device 110 are to include all of the components shown in FIG. 1. Rather, the stylus 100 and computer device 110 can include fewer or additional components not illustrated in FIG. 1, e.g., additional applications, additional modules, additional memory devices, additional network interfaces (not shown), and the like. Further, the stylus 100 and computer device 110 are not limited to the modules shown as any combinations of the code used to implement these functions can be implemented. For example, other wireless channels can be used to communicate information from the stylus device 100 to a computer device 110. Further, in some embodiments, symmetric encryption, where the encryption key and decryption key are the same and hence encryption and decryption actions are performed using the same key, can be utilized for authenticating a stylus device 100. Symmetric encryption can be used in systems where the computer device 110 has secured the key. Bi-directional transmission between the stylus device and computer device over the channel can also enable two-way authentication techniques, and the exchange of cryptographic information and other credential values. Variations of the previous techniques including, but not limited to, code sequence generation, seed initialization, key generation and initialization, encryption and decryption, hash functions and other credential values, data transmission methods and channels between devices and components, and use of additional secrets, seeds or unique identifiers when generating a credential value, like those provided by biometric sensors, for example, will be apparent to those skilled in the art.

Figure 2:
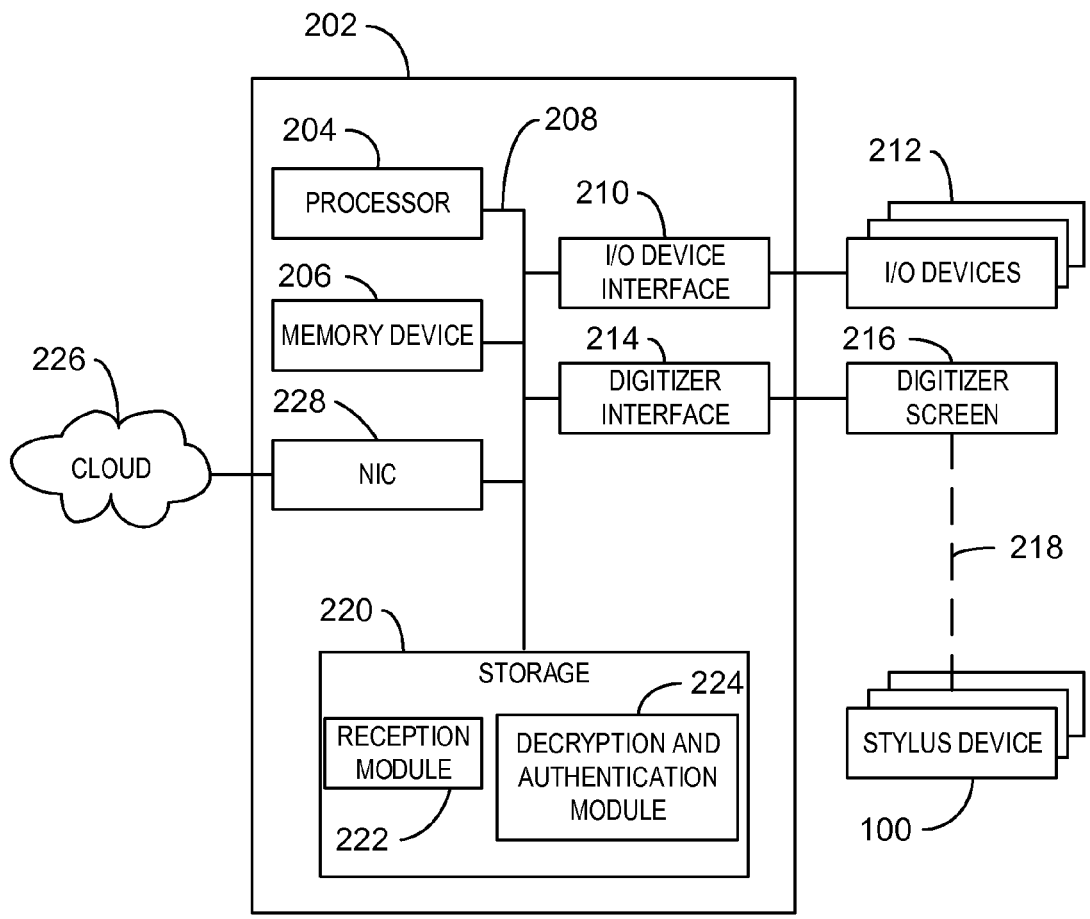
FIG. 2 is a block diagram of an example of a system for authenticating a stylus device and cryptographically authenticating an author of digital ink.

FIG. 2 is a block diagram of an example of a system 200 for authenticating a stylus device and cryptographically authenticating an author of digital ink. The stylus device of the system 200 can be, for example, one or more of the stylus device 100 from FIG. 1. The system 200 includes a computer device 202 for interacting with the stylus device 100. In some embodiments, the computer device 202 can be a tablet device, a smart phone, a laptop computer, a personal digital assistant (PDA), or similar device that can interface with a stylus device 100. In some embodiments, the computer device 202 may be a desktop computer, for example. The computer device 202 can include a processor 204 that is adapted to execute stored instructions, as well as a memory device 206 that stores instructions that are executable by the processor 204. The processor 204 can be a single core processor, a multi-core processor, a computing cluster, or any number of other configurations. The memory device 206 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 204 can be used to implement the cryptographic authentication and identification techniques of a stylus device as described herein.

The processor 204 may be connected through a system bus 208 (e.g., a proprietary bus, PCI, ISA, PCI-Express, HyperTransport®, etc.) to an input/output (I/O) device interface 210 adapted to connect the computer device 202 to one or more I/O devices 212. The I/O devices 212 can include, for example, a camera, a gesture recognition input device, a keyboard, a pointing device, and a voice recognition device, among others. The pointing device may include a touchpad or a touchscreen, among others. The I/O devices 212 can be built-in components of the computer device 202, or can be devices that are externally connected to the computer device 202.

The processor 204 can also be linked through the system bus 208 to a digitizer interface 214 adapted to connect the computer device 202 to receive and interpret information from a digitizer screen 216. The digitizer screen 216 may include a display screen that is a built-in component of the computer device 202. The digitizer screen 216 can also include a computer monitor, television, or projector, among others, that is externally connected to the computer device 202. The stylus device 100 can transmit cryptographic information through a digitizer channel 218 when the stylus device 100 is touching or within a hover range of the digitizer screen. In embodiments, the hover range for the digitizer channel 218 can be any suitable distance between the tip of the stylus device 100 and the digitizer screen 216, for example, around 10 mm to 20 mm. In some examples, the hover range can be any suitable distance that prevents an intruder in close proximity from intercepting data transmitted via the digitizer channel 218. In other embodiments, when the hover range is exceeded, an auxiliary wireless channel can optionally be used for transmitting the encrypted data.

Storage 220 can be coupled to the processor 204 through the bus 208. The storage 220 can include a hard drive, a solid state drive, an optical drive, a USB flash drive, an array of drives, or any combinations thereof. The storage 220 can include a number of modules configured to implement stylus authentication and identification of digital ink authorship as described herein. For example, the storage 220 can include a reception module 222 configured to receive and store data transmitted from the stylus device 100. The reception module 222 can receive cryptographically related data such as a unique stylus ID, and an initial seed value for a pseudorandom number generator from the stylus device 100. As discussed above, the stylus device 100 may encrypt each generated code with an encryption key generated by the stylus device 100 during a setup phase to create a sequence of digital signatures. The reception module 222 can also receive the digital signatures from the stylus device 100 and store the received information at storage 220.

The storage 220 can further include a decryption and authentication module 224. The decryption and authentication module 224 can decrypt the digital signatures received from the stylus device 100. The decryption and authentication can be based on the public key, the initial seed value for the pseudorandom sequence of numbers, and a time since the initial seed value was generated. The decryption and authentication module 224 can authenticate the digital signature has been properly decrypted. By using the stylus ID broadcast by the stylus device 100, the decryption and authentication module 224 can retrieve the cryptographic credentials (e.g., decryption key, seed value, and other cryptographic parameters) related to the stylus device 100 and ensure the decrypted digital signature matches the expected sequence of codes. In some embodiments, the last code of the sequence that is received by the computer device 202 can be decrypted and used as a second factor of authentication. This second factor of authentication may be in addition to a user of the stylus device 100 submitting other security credentials, such as name and password, for example. This technique enables access for the stylus device 100 to the computer device 202 based on whether cryptographic data and stylus ID related to the stylus device is authenticated.

Also included in the system 200 is a cloud 226 server or network. The cloud 226 can be connected to the computer device 202 by transmitting information through a network interface controller (NIC) 228. The NIC 228 may be adapted to connect the computer device 202 through the system bus 206 to the cloud 226 or network. The network may be a local area network (Ethernet LAN), or a wireless (WiFi) network, among others. In embodiments, the cloud 226 can perform the decryption and authentication techniques described with regards to the modules in storage 220, by using the cryptographic information related to the stylus device 100.

In embodiments, a device or server on the cloud 226 uses a digital ink authorship service to determine a user from a plurality of users who authored digital ink on a shared computer device 202. For example, a device or server on the cloud 226 can receive an encrypted sequence broadcast by User A's stylus device and the stylus ID for the stylus device. However, the shared computer device 202 may not have the cryptographic credentials (e.g., decryption key, initial seed value, or time since the initial seed value was generated) from the stylus device 100. In some embodiments, the decryption key related to the stylus ID can be securely uploaded to the cloud 226 as part of account credentials by a trusted computing device prior to using a shared computing device 202. Any suitable shared computing device 202 can then forward a digital signature to the cloud 226 for authentication purposes. For example, User A's stylus cryptographic credentials can then be used by the digital ink authorship service in the cloud 226 to authenticate a digital signature from User A's stylus. The digital ink authorship service in the cloud 226 can then return an indication that the identity of User A is authenticated. In other embodiments, the digital signature can be authenticated based on the stylus cryptographic credentials key that have been stored locally at storage 220, such as a hard disk drive or solid state drive, for example. A stylus ID and cryptographic credentials transmitted by a stylus device 100 to the computer device 202 during a security setup phase can be stored and used to determine if a stylus device claiming to have the same device ID is also transmitting digital signatures matching the expected sequence of codes implied by the previously stored cryptographic credentials. Thus, a computer device 110 that stores and later accesses the cryptographic credentials for the stylus device 100 can decrypt the digital signature and recover the original sequence transmitted by the stylus device 100.

In some embodiments, a unique author of digital ink that transmitted information from a user's stylus to a computer device can be cryptographically authenticated. In some examples, the stylus that transmitted digital ink on a computer device shared between User A, User B, User C, or any other number of users on a computer device with access to the cloud 226 can be determined. For example, assume User A and User B are both transmitting data from stylus devices on User C's computer device. In an embodiment, the cloud 226 can execute an ID validation service or authentication application that receives an encrypted code, $Y_n$, broadcast by User A, with a corresponding stylus ID, with the purpose of verifying whether $Y_n$ was generated by User A's stylus device or by another stylus device, such as that possessed by User B. User C's computer device has access to both $Y_n$ and User A's stylus ID, since $Y_n$ and the stylus ID are openly transmitted by a stylus device to the digitizer or digitizer interface of the computer device whenever the stylus device is in contact or within a close range. The ID validation service accesses User A's previously uploaded cryptographic credentials (e.g., decryption key, initial seed value, or time since the initial seed value was generated) based on the corresponding stylus ID, decrypts $Y_n$ with the decryption key to obtain $X_n$, and checks if $X_n$ matches the expected sequence value at this point in time since the initial seed was generated. If the values match, the identity of User A has been cryptographically authenticated. An author of digital ink can be verified on User C's computer device, ensuring stylus ID authenticity without weakening the security of User A's stylus device. User B does not have the secrets (e.g., encryption key or initial seed value) for User A's stylus, so User B cannot produce User A's transmitted codes, even within range of the transmission. The transmitted code $Y_n$ could not have been forged unless an attacker cloned the stylus ID, and all of the secrets of User A's stylus, which may include for example an encryption key, a PRNG seed, and a key generation timestamp. Thus, the stylus device can be cryptographically and securely authenticated on any computer device with access to the cryptographic credentials stored either locally or on the cloud 226. In embodiments, the stylus device 100 is permitted access to the computer device 202, enabling data to be transmitted from the stylus device to the computer device in response to detecting that a stylus ID related to the stylus device is authenticated.

Figure 3:
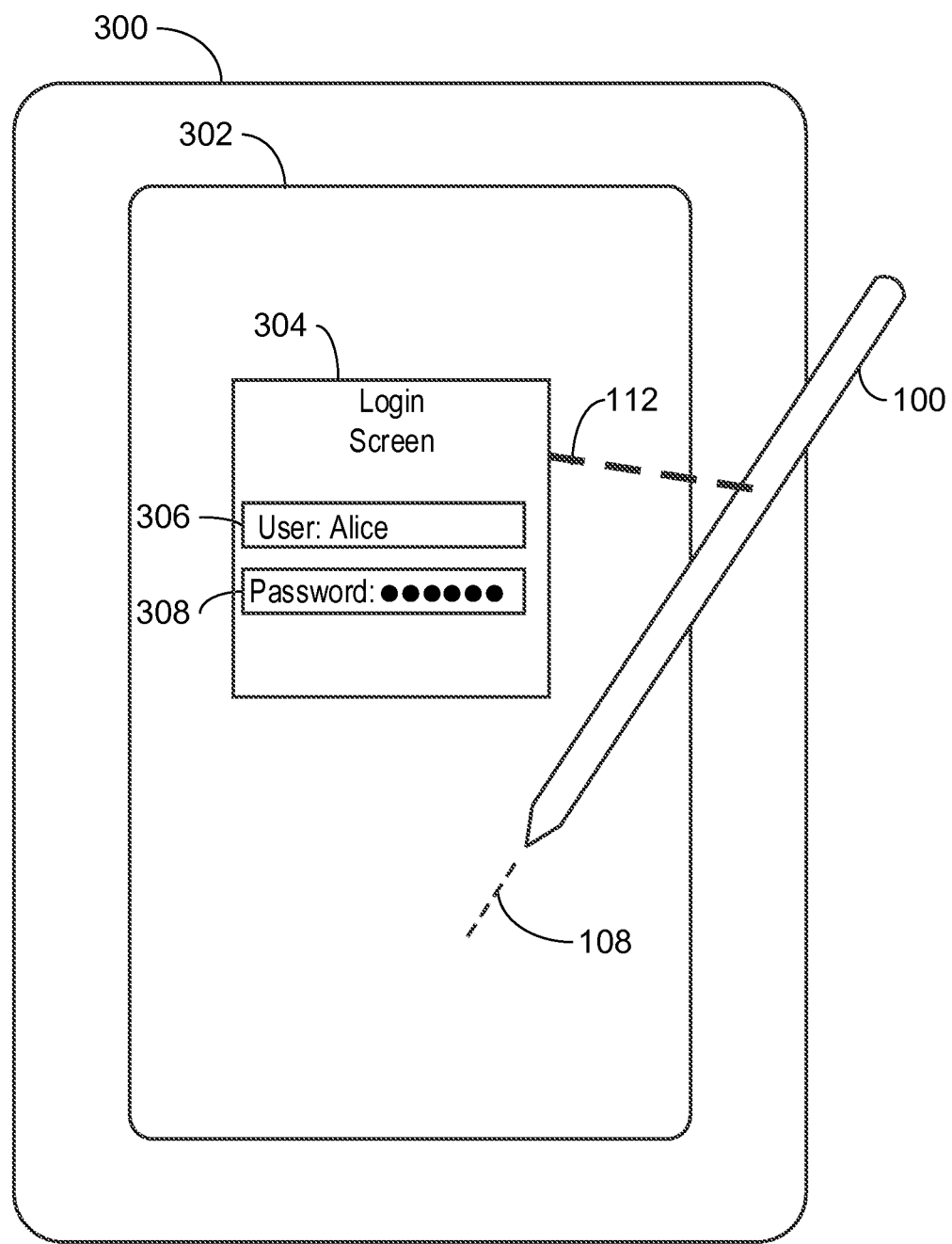
FIG. 3 is a block diagram of an example tablet computer device interacting with a stylus device.

FIG. 3 is a block diagram of an example tablet computer device 300 interacting with a stylus device 100. The tablet computer device 300 includes a touch screen 302. The touch screen 302 in the illustration is displaying a login screen 304 for a user of the tablet computer device 300 to enter her credentials. A user entry window 306 shows that a user, Alice, is trying to access the tablet computer device 300. A password entry window 308 shows where a user may enter the characters of her password for the tablet computer device 300. The user name and password combination can be one factor of authentication to access the tablet computer device 300. Through either digitizer channel 108, or wireless auxiliary channel 112, the stylus device 100 can transmit cryptographic credentials related to the stylus device 100 as a second factor of authentication. This technique enables access for the stylus device 100 to the tablet computer device 300 based on whether cryptographic data and stylus ID related to the stylus device 100 is authenticated.

Figure 4:
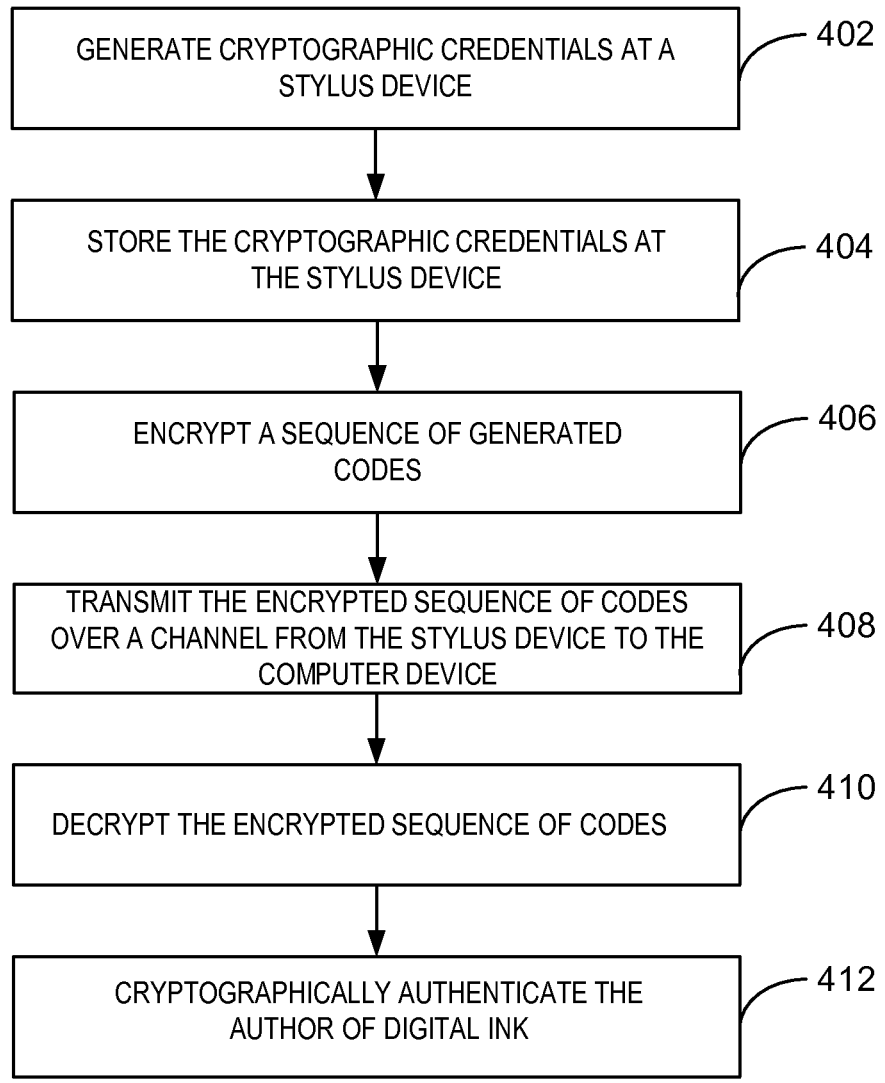
FIG. 4 is a process flow diagram of an example method for security setup and authentication of a stylus device.

FIG. 4 is a process flow diagram of an example method 400 for security setup and authentication of a stylus device. The method 400 allows a host computer device to decrypt a pseudorandom number sequence generated, encrypted and transmitted by a stylus device, and validate the stylus as uniquely identifiable. The method 400 can cryptographically authenticate a stylus device associated with a specific user when in proximity to a host computer device. The method 400 may be implemented by the stylus device 100 and computer system 110 described with respect to FIG. 1, for example.

At block 402, the circuit 102 generates cryptographic data, such as identification and authentication credentials, at the stylus device. The credentials can include a decryption key, an encryption key, an initial seed and a timestamp corresponding to the generation of the initial seed at the stylus device. In some embodiments, the decryption key and the encryption key can be the same to enable symmetric encryption between the stylus device and a computing device. In other embodiments, the decryption key and the encryption key can be different to enable asymmetric encryption between the stylus device and a computing device. The decryption key and encryption key can be generated using any suitable encryption technique or application. Additionally, the pseudorandomly generated number sequence can be generated using any suitable number generator such as a cryptographically secure pseudorandom number generator, among others. In some embodiments, there may be no encryption. In some embodiments, a hash function could be used instead of a PRNG. In some examples, a time associated with the generation of the initial seed, decryption key, and/or encryption key (e.g., the time the initial seed, decryption key, and/or encryption key was generated) can also be generated to enable recreating the pseudorandomly generated number sequence.

At block 404, a storage unit 105, stores the cryptographic data, which can include a decryption key, encryption key, initial seed value as identification and authentication credentials at the stylus device. In some examples, the storage unit 105 also stores a stylus ID associated with the stylus device, and the time corresponding to the generation of the initial seed value, decryption key, and/or encryption key. As discussed above, the stylus ID is a serial number related to an individual stylus for distinction and identification. The time that is recorded on the stylus can correspond to the generation of the sequence of pseudorandomly generated numbers. This time can later be used with the initial seed to determine and authenticate the original credentials of the stylus device.

At block 406, the method 400 continues when the circuit 102 encrypts the sequence of pseudorandomly generated numbers using the encryption key to produce a sequence of digital signatures. In some embodiments, the stylus device 100 internally generates the pseudorandom sequence of numbers to be encrypted, for example, $X_0, X_1, \ldots, X_n$, by generating a new number for the sequence every N seconds. The stylus device 100 encrypts each code of the pseudorandomly generated sequence with the encryption key. The sequence $Y_0, Y_1, \ldots, Y_n$ represents a sequence of digital signatures of the sequence $X_0, X_1, \ldots, X_n$ that has been encrypted by the encryption key.

At block 408, the stylus device uses a digitizer channel 108 to transmit the stylus ID and the digital signature. The digital signature can demonstrate the authenticity of a digital message or document sent over the digitizer channel, or other wireless channel, of the stylus device. A valid digital signature indicates to a computer device that the message was created by a known stylus device. In some examples, a valid digital signature can also indicate that the message maintained integrity and was not altered in transit. In some embodiments, the digitizer channel 108 also transmits the initial seed value and time associated with the generation of the initial seed value.

At block 410, the stylus device uses a digitizer channel 108 to detect a response from a computer device that the stylus device is authenticated and access to transmit user data to the computer device is permitted. User data, also referred to as digital ink herein, can include any suitable input provided by the stylus device to a computer device such as a signature, drawings, or alphanumeric characters, among others. After the stylus device is authenticated, the stylus device can transmit any amount of user data or digital ink to a computing device and the authorship of the digital ink may be saved along with the user data at the computing device.

The process flow diagram of FIG. 4 is not intended to indicate that the steps of the method 300 are to be executed in any particular order, or that all of the steps of the method 300 are to be included in every case. Further, any number of additional steps may be included within the method 400, depending on the specific application.

Figure 5:
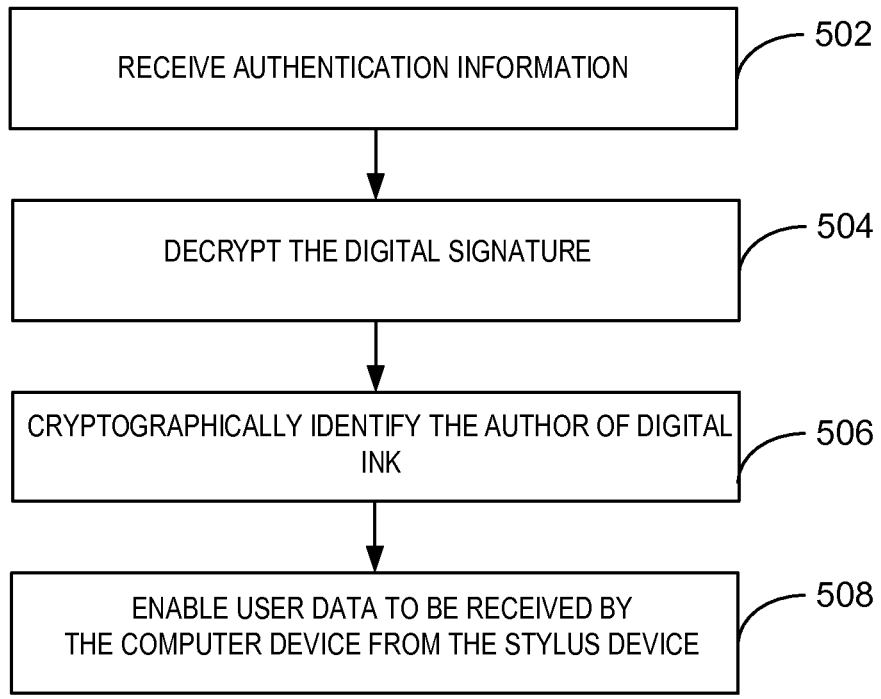
FIG. 5 is a process flow diagram of an example of a method for authenticating the identity of a stylus device that is the author of digital ink on a computer device.

FIG. 5 is a process flow diagram of an example of a method 500 for authenticating the identity of a stylus device that is the author of digital ink on a computer device. The method 500 may be implemented by the system 200 described with respect to FIG. 2, for example. The method 500 begins at block 502 where cryptographic or authentication information is received at the computer device. The cryptographic or authentication information can include a decryption key, encryption key, and a digital signature generated and encrypted by the stylus device. As discussed above, the stylus device can encrypt a pseudorandom sequence of numbers using the encryption key stored at the stylus device to create the digital signature.

At block 504, a decryption and authentication module 224 decrypts the digital signature that has been encrypted with the encryption key. The digital signature can be decrypted using the corresponding decryption key related to the stylus ID of the stylus device that is transmitting data or digital ink. In some embodiments, the stylus ID can be unique to one user, assuming that user keeps the related stylus device in his possession. Thus, the stylus ID, once decrypted and authenticated, can indicate an author of digital ink produced by the stylus.

At block 506, the decryption and authentication module 224 can cryptographically authenticate an author of digital ink corresponding to the stylus device on the computer device. For example, the decryption and authentication module 224 can compare the pseudorandomly generated code included in the digital signature from the stylus to a recreated pseudorandomly generated number at the computing device. In some embodiments, the digital signature can be verified by processing the signature value with the stylus device's corresponding decryption key and comparing the resulting number sequence with the pseudorandom sequence generated by the stylus. The encrypted sequence of pseudorandomly generated numbers that has been decrypted can be used as a second factor of authentication, without a user entering the authenticating code.

In some embodiments, the digital signature can be a second factor of authentication that accompanies any suitable first factor of authentication. For example, entering login credentials for a user related to the stylus device at a computer device can be a first factor of authentication, or a fingerprint, and the like. In some embodiments, the stylus device can identify a particular user based on recognition of a fingerprint or other biometric identifier on the stylus device, and transmit data based on the identified user. A stylus device with biometric sensors, for example, could allow multiple users to share and be authenticated with a single stylus device.

In some embodiments, the computing device may be an untrusted device, which does not receive secrets from the stylus, and does not undergo a security setup process with the stylus. Rather, the computing device may receive the digital signature and stylus ID, which are forwarded to a cloud service that has access to the decryption key and/or other necessary elements of the stylus cryptographic credentials. The cloud service can indicate if the stylus has been authenticated. In some embodiments, code generation can be with a PRNG that generates a new code every N seconds. A private encryption key can remain secret on the stylus device, and a decryption key can be transmitted to a computer device along with initial seed and timestamp when the seed was generated. In some embodiments, a hash function can be utilized to generate a new code as a hash sequence.

At block 508, user data is enabled to be received by the computer device from the stylus device in response to detecting that the digital signature related to the stylus device is authenticated. For example, the computer device can receive any suitable amount of user data following authentication of the stylus device. In some embodiments, the stylus ID corresponding to the stylus device can be stored along with the user data.

The method 500 of having any digitizer interface on any computer device, potentially insecure, and from any owner provides a means for increasing the security of a stylus device, and can authenticate whether one or another stylus device was the author of digital ink left on a computer device. The process flow diagram of FIG. 5 is not intended to indicate that the steps of the method 500 are to be executed in any particular order, or that all of the steps of the method 500 are to be included in every case. Further, any number of additional steps may be included within the method 500, depending on the specific application. For example, the computing device may not receive the decryption key from the stylus device if the computing device is an unsecured or untrusted device. Accordingly, the computing device may transmit the digital signature and a stylus ID associated with the stylus device to an authentication application residing in a cloud service. The cloud service can include the decryption key associated with the stylus ID, which can enable the cloud service to decrypt the digital signature and authenticate the identity of the author of digital ink detected by the computer device. Furthermore, the computing device may access a decryption key and send a confirmation of the author of digital ink to a second computer device.

Figure 6:
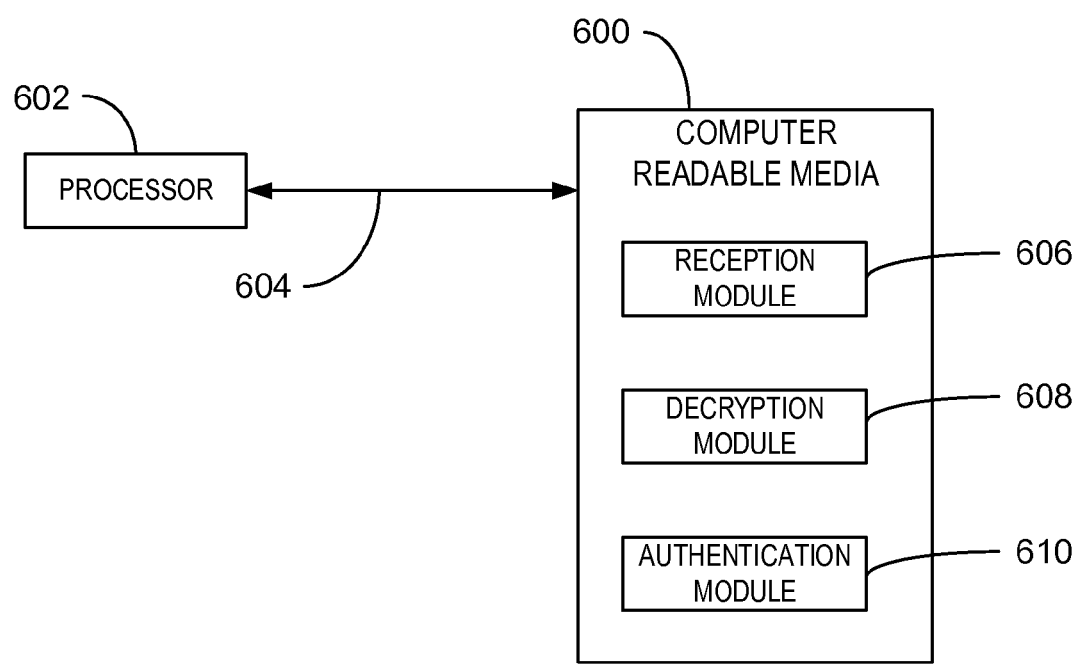
FIG. 6 is a block diagram showing a computer-readable storage media that can store instructions for cryptographically authenticating an author of digital ink.

FIG. 6 is a block diagram showing computer-readable storage media 600 that can store instructions for cryptographically authenticating an author of digital ink. The computer-readable storage media 600 may be accessed by a processor 602 over a computer bus 604. Furthermore, the computer-readable storage media 600 may include code to direct the processor 602 to perform steps of the techniques disclosed herein.

The computer-readable storage media 600 can include code as a reception module 606 configured to direct the processor 602 to receive cryptographic information, such as a unique stylus ID, and an initial seed value for a code generator from a stylus device. The stylus device encrypts each code with an encryption key generated by the stylus device during a setup phase to create a digital signature. The reception module 606 also receives the digital signature from the stylus device, and the processor can direct the received information be saved in storage.

Further, the computer-readable storage media 600 can include a decryption module 608 configured to direct the processor 602 to facilitate a decryption. The decryption module 608 can decrypt the digital signature received from the stylus device. The decryption can be based on the decryption key, the initial seed value for the sequence of codes, and a time since the initial seed value was generated.

Another block of code called the authentication module 510 can instruct the processor to authenticate the digital signature has been properly decrypted. By using the stylus ID broadcast by a stylus device, the authentication module 510 can direct the processor to access the decryption key related to the stylus device. The authentication module 510 can ensure the decrypted digital signature matches the expected sequence of numbers. In some embodiments, a computer device that may access the decryption key for the stylus device, for example, over a cloud server, can decrypt the digital signature and recover the original sequence transmitted by any stylus device that has its decryption key and stylus ID available that is inking on the computer device.

It is to be understood that any number of additional software components not shown in FIG. 5 may be included within the computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

An example stylus device. The example stylus device includes a first module to generate and store cryptographic credentials that include a secret value. The example stylus device includes a second module to transmit the secret value from the stylus device over a secure channel to a computer device. The example stylus device includes a third module to generate a sequence of codes which depend on the secret value. The example stylus device includes a fourth module to transmit the sequence of codes over a second channel.

The secure channel of the example stylus device can be a digitizer channel that transmits using a short range protocol. The digitizer channel can transmit to a computer device when the stylus device is touching the computer device or when the stylus device is within a hover range of the computer device. In addition, the digitizer channel is configured for bi-directional communication between the stylus device and a computer device. The secure channel and second channel can be the same. Alternatively, the second channel can be an additional channel to transfer data between the stylus device and a computer device. The second channel can be a wireless auxiliary channel that is used when the stylus device exceeds a hover distance from the computer device. In the example stylus device, the sequence of codes can be generated with a pseudorandom number generator. Alternatively, the sequence of codes is generated with a hash function. In the example stylus device, the secret value can include an initial seed to generate the sequence of codes. In addition, the secret value can include a key used to decrypt the sequence of codes. Alternatively, the secret value can include data computed by the stylus device from a biometric sensor on the stylus device.

EXAMPLE 2

An example stylus device including multiple modules. The example stylus device includes a first module to generate and store cryptographic credentials which include a public and private key pair for use by an asymmetric encryption algorithm. The example stylus device includes a second module to transmit the public key from the stylus device over a first channel to a computer device. The example stylus device includes a third module to generate a sequence of codes encrypted with the private key. The example stylus device includes a fourth module to transmit the sequence of codes over a second channel to a computer device.

In addition, the first channel or the second channel of the example stylus device can transmit data using a low energy protocol. The first channel can convey data to the computer device when the stylus device is touching the computer device or when the stylus device is within a hover range of the computer device. The first channel can be a digitizer channel. Alternatively, the first channel and second channel can be the same channel. In addition, the second channel can be a wireless auxiliary channel at the stylus device to transmit the encrypted sequence and the stylus ID when the stylus device exceeds the hover range. In addition, the sequence of codes can be generated with a pseudorandom number generator. Alternatively, the sequence of codes can be generated with a hash function.

EXAMPLE 3

An example method for authenticating an identity of a stylus device that is an author of digital ink on a computer device. The example method includes receiving a value generated by the stylus device during an initialization stage. The example method includes receiving a code generated from the stylus device during an authentication stage. The example method also includes cryptographically authenticating an author of digital ink corresponding to the stylus device on the computer device based in part on the value and the received code.

In addition, the value can include an initial seed to generate a sequence of codes. The sequence of codes can be generated with a pseudorandom number generator or a hash function. In addition, the value can include a key, and the key is used to decrypt the code. The example method can also include decrypting the generated code. The example method can include cryptographically authenticating the author of digital ink using a cloud service, the cloud service receiving the value and generated code. The example method can include sending a confirmation from the cloud service that the author of the digital ink corresponds to the stylus device.

EXAMPLE 4

An example computing device for cryptographically authenticating a stylus device for an author of digital ink. The computing device includes a first module to receive data from a stylus device over a channel when the stylus device is within a hover range of the computing device. The computing device includes a second module to authenticate a digital signature based on a secret value generated by the stylus device during an initialization phase. The computing device also includes a third module to cryptographically authenticate an author of digital ink based on the authentication of the digital signature.

In addition, the example computing device includes a storage device that includes a hard disk drive or solid state drive of the computing device, and wherein the digital signature is authenticated based on the secret value that is stored in the hard disk drive or the solid state drive. Alternatively, the computing device is a part of a cloud service. The example computing device can include a fourth module to access the secret value, and send a confirmation of the author of digital ink to a second computing device. The example computing device can include a fifth module to detect a stylus ID related to the stylus device that is authenticated and enable the stylus associated with the stylus ID to transmit user data to the computing device.

EXAMPLE 5

An example computing device for cryptographically authenticating a stylus device for an author of digital ink includes a first module to receive data from a stylus device over a channel when the stylus device is within a hover range of the computing device. The computing device includes a second module to decrypt and authenticate a digital signature based on a public key generated by the stylus during an initialization phase. The computing device includes a third module to cryptographically authenticate an author of digital ink based on the authentication of the digital signature.

In some implementations, the computing device includes a storage device such as a hard disk drive or solid state drive. The digital signature is authenticated based on the key that is stored in the hard disk drive or the solid state drive. In some implementations, the computing device includes a fourth module to access the key, and to send a confirmation of the author of digital ink to a second computing device. In some implementations, the computing device includes a fifth module to detect a stylus ID related to the stylus device that is authenticated and to enable the stylus associated with the stylus ID to transmit user data to the computing device. The computing device can include a wireless auxiliary channel at the stylus device for optionally transmitting the encrypted sequence and the stylus ID over a radio frequency when the stylus device exceeds a hover range from the computing device.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A stylus device, comprising:
a first module to generate and store cryptographic credentials comprising a public and private key pair for use by an asymmetric encryption algorithm; and
a second module to transmit the public key from the stylus device over a first wireless channel to a computer device;
a third module to generate a sequence of codes encrypted with the private key, wherein the sequence of codes is generated with a pseudorandom number generator or a hash function; and
a fourth module to transmit the encrypted sequence of codes and a stylus ID corresponding to the stylus to a computing device over a second wireless channel in response to the stylus device exceeding a hover range.

2. The stylus device of claim 1, wherein the first wireless channel comprises a digitizer channel.

3. The stylus device of claim 1, wherein the second wireless channel is configured to transmit the encrypted sequence of codes and the stylus ID using a radio frequency when the stylus device exceeds a hover distance from the computer device.

4. The stylus device of claim 1, wherein the first wireless channel or the second wireless channel transmits data using a low energy protocol.

5. A method for authenticating an identity of a stylus device that is an author of digital ink on a computer device, comprising:
receiving a public key generated by the stylus device during an initialization stage via a first wireless channel;
receiving an encrypted sequence of code generated by the stylus device and a corresponding stylus ID via a second wireless channel in response to the stylus device exceeding a hover range during an authentication stage, wherein the sequence of code is encrypted with a private key corresponding to the received public key;
decrypting the encrypted sequence of code with the received public key;
and
cryptographically authenticating an author of digital ink corresponding to the stylus device on the computer device based in part on the public key, the decrypted sequence of code, and the stylus ID.

6. The method of claim 5, wherein the sequence of codes is generated with a pseudorandom number generator or a hash function.

7. The method of claim 5,
wherein cryptographically authenticating the author of the digital ink is performed using a cloud service and comprises sending a confirmation from the cloud service that the author of the digital ink corresponds to the stylus device.

8. A computing device for cryptographically authenticating a stylus device for an author of digital ink, comprising:
   a first module to receive a digital signature from a stylus device over a first wireless channel when the stylus device is within a hover range of the computing device;
   a second module to decrypt and authenticate the digital signature based on a public key received from the stylus device during an initialization phase over the first wireless channel and a stylus ID received via a second wireless channel in response to the stylus device exceeding a hover range;
   a third module to cryptographically authenticate an author of digital ink based on the authentication of the digital signature; and
   a fourth module to:
      access the public key to encrypt a confirmation message of the author of the digital ink; and
      send the encrypted confirmation message to a second computing device.

9. The computing device of claim 8, comprising a storage device that comprises a hard disk drive or solid state drive of the computing device, and wherein the digital signature is authenticated based on the public key that is stored in the hard disk drive or the solid state drive.

10. The computing device of claim 8, further comprising a fifth module to detect a stylus ID related to the stylus device that is authenticated and enable the stylus associated with the stylus ID to transmit user data to the computing device.

11. A system for cryptographically authenticating a stylus device for an author of digital ink, comprising:
   a first module to receive data including a digital signature from a stylus device over a first wireless channel in response to detecting that the stylus device is within a hover range of a computing device;
   a second module to decrypt and authenticate a digital signature based on a public key generated by the stylus during an initialization phase;
   a third module to cryptographically authenticate an author of digital ink based on the authentication of the digital signature; and
   a stylus device comprising a second wireless channel at the stylus device for transmitting an encrypted sequence of code and a stylus ID over a radio frequency in response to the stylus device exceeding a hover range from the computing device.

12. The system of claim 11, comprising a storage device that comprises a hard disk drive or solid state drive of the computing device, and wherein the digital signature is authenticated based on the public key that is stored in the hard disk drive or the solid state drive.

13. The system of claim 11, comprising a fourth module to:
   access the public key to encrypt a confirmation message; and
   send the encrypted confirmation message of the author of digital ink to a second computing device.

14. The system of claim 13, further comprising a fifth module to detect a stylus ID related to the stylus device that is authenticated and enable the stylus associated with the stylus ID to transmit user data to the computing device.

* * * * *